Jan. 11, 1955

W. ALBRICHT

SUPPRESSED CARRIER SINGLE SIDE BAND RADIO TRANSMISSION SYSTEM

Filed March 23, 1951

2,699,494

INVENTOR
WILHELM ALBRICHT

BY [signature]

AGENT

United States Patent Office 2,699,494
Patented Jan. 11, 1955

2,699,494

SUPPRESSED CARRIER SINGLE SIDE BAND RADIO TRANSMISSION SYSTEM

Wilhelm Albricht, Eindhoven, Netherlands, assignor to Hartford National Bank and Trust Company, Hartford, Conn., as trustee Application March 23, 1951, Serial No. 217,237

Claims priority, application Netherlands May 8, 1950

6 Claims. (Cl. 250—6)

This invention relates to systems for the transmission of signals, for example speech or music, teletype printing- or television signals, the transmission of a plurality of signals by frequency multiplex, by single side-band transmission with suppressed carrier-wave and two pilot frequency side-bands, from which last-mentioned side-band frequencies the carrier-wave to be used locally is recovered at the receiver end and relates also to a receiver to be used in such a system.

The invention has for its object to provide a system yielding a considerable saving of energy by complete suppression of the carrier-wave at the transmitter end, the carrier-wave being recovered in the correct phase by simple means at the receiver end.

According to the invention, in a system of the type referred to in the preamble, the frequency spacing at the transmitter end between the carrier-wave frequency and the neighbouring pilot frequency side-band is made equal to the frequency spacing of the pilot frequency side-bands or to a small multiple (6 or less) thereof, and at the receiver end the pilot frequency side-bands are selected and supplied to a mixer stage wherein an oscillation is produced which is mixed with one of the pilot frequency side-bands for recovering the carrier-wave to be used locally.

The means used in the receiver for recovering the carrier-wave to be used locally preferably comprise:

(*a*) A pilot frequency side-band selector for a frequency-separation of the pilot frequency side-bands from the remaining side-band frequencies;

(*b*) A mixer stage, the input of which is connected to the output of the pilot frequency side-band selector and in the output circut of which an auxiliary oscillation occurs with a frequency equal to the frequency spacing of the pilot frequency side-bands or to a small multiple preferably double the value thereof;

(*c*) A mixer stage, to one input of which the auxiliary oscillation and a pilot frequency side-band are supplied, the output circuit comprising a carrier-wave filter which is tuned to the frequency of the carrier-wave suppressed upon transmission and in the output circuit of which the recovered carrier-wave occurs.

The aforesaid mixer stages may be constructed as a single diode mixer stage.

In order that the invention may be readily carried into effect, an example will now be described in detail with reference to the accompanying drawings of which:

Figure 1:
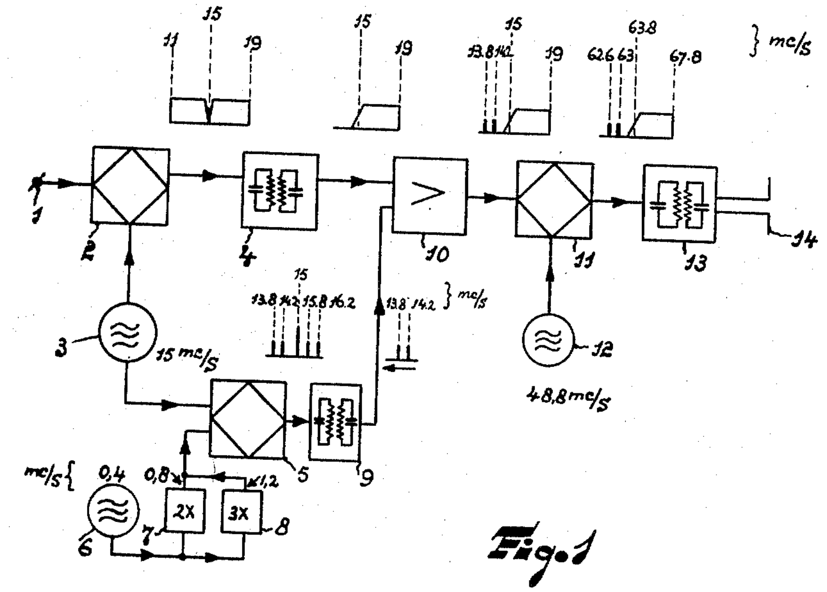
Fig. 1 is a block diagram of a transmitter.

Fig. 1 shows a television transmitter. The video signal supplied to an input terminal 1 is modulated with carrier-wave suppression in a modulator 2 with the oscillations from a local oscillator 3 tuned to a frequency of 15 megacycles/second. The side-band oscillations set up in the output of the modulator 2, the frequencies of which extend from 11 to 19 mc./s., are supplied to a filter 4 which suppresses one of the side-bands and at the same time filters out any undesired frequencies. The carrier-wave of the oscillator 3 is also supplied to a modulator 5 and modulated with two oscillations of 0.8 and 1.2 mc./s. respectively obtained by frequency doubling (7) and a frequency triplication (8) respectively of a voltage from an oscillator 6 (0.4 mc./s.). Consequently, side-band frequencies of 13.8, 14.2 mc./s. and 15.8, 16.2 mc./s. respectively occur beside the carrier-wave frequency of 15 mc./s. in the output circuit of the modulator 5, the frequency spacing between the carrier-wave frequency and the neighbouring side-band frequency corresponding to double the frequency spacing of the side-band frequencies. Subsequently, the side-band frequencies of 13.8 and 14.2 mc./s. are selected by a filter 9 connected to the output of modulator 5 and supplied as pilot frequency side-bands, if desired after amplification, together with the single-sideband signal with suppressed carrier wave from the filter 4, to an amplification stage 10.

The resulting single side-band signal with suppressed carrier-wave and two pilot frequency side-bands is frequency-converted in a mixer stage 11 comprising a local oscillator 12 tuned to 48.8 mc./s. and transmitted by way of a filter 13 and any further amplification stages from an aerial 14. Filter 13 suppresses one of the side-band signals and the carrier yielded by mixer stage 11, so that transmitted are the pilot frequencies 62.6 and 63 and a single side-band signal.

Figure 2:
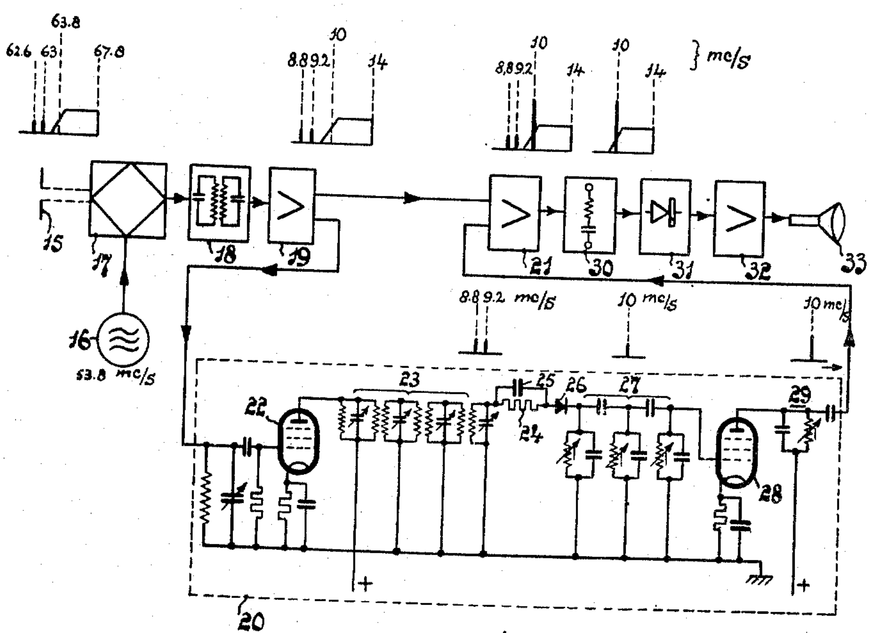
Fig. 2 shows in greater detail a diagram of a receiver according to the invention.

Fig. 2 shows an example of a single side-band receiver of the superheterodyne type to be used in a system according to the invention. The single side-band signal with suppressed carrier-wave and two pilot frequencies, which is emitted by the transmitter shown in Fig. 1 and picked up by an aerial 15, is mixed, in a mixer stage 17, with the signal from a local oscillator 16 tuned to a frequency of 53.8 mc./s. After filtering (18), the intermediate frequency obtained is amplified in an intermediate-frequency amplifier 19 and supplied on the one hand through a device 20 for recovering the carrier-wave to be used locally from the pilot frequency side-bands and on the other hand directly to an amplification stage 21.

The arrangement 20 compresses a tube 22, to the control-grid circuit of which the intermediate-frequency signal is supplied, and the anode circuit of which comprises a pilot frequency side-band selector 23 for frequency-separation of the pilot frequency side-bands of 8.8 and 9.2 mc./s. and the remaining side-band frequencies of 10 to 14 mc./s. The pilot frequencies of 8.8 and 9.2 mc./s. occurring at the output of the filter 23 are intermixed in a diode mixer stage consisting of the series-connection of a series resistance 24 with parallel condenser 25, a diode rectifier 26 and a carrier-wave filter 27 tuned to 10 mc./s., which series-combination is connected to the output of the pilot frequency side-band selector 23.

Through the resistance 24 an auxiliary oscillation occurs, the frequency of which is equivalent to the second harmonic of the difference-frequency of the two pilot frequencies. After mixing with the pilot frequency of 9.2 mc./s. in the same mixer stage the said auxiliary oscillation yields, after the carrier-wave filter 27, the recovered carrier-wave of 10 mc./s. This carrier-wave is supplied, through a buffer amplifying tube 28 with output filter 29, to the amplification stage 21 and added to the intermediate-frequency oscillations which are taken from the output of the intermediate-frequency amplifier 19 and also supplied thereto.

Means should be provided for adjustment of the correct phase of the carrier-wave to be used locally. This may be effected in a simple manner by tuning control of the carrier-wave filter 27 or of the filter 29.

By means of a filter 30 the two pilot frequency side-bands are subsequently eliminated from the thus obtained singe side-band signal with local carrier-wave and two pilot frequency side-bands. The remaining signal is supplied to a detector 31. After further amplification (32), the television signal obtained after detection controls a cathode-ray tube 33.

What I claim is:

1. A signal communication system comprising a suppressed-carrier, single side-band transmitter including a carrier wave generator, means to modulate said carrier wave with an intelligence signal to produce a single signal side-band, first and second pilot frequency sources, and means to modulate said carrier wave with said pilot frequencies to produce two pilot frequency side-bands, the frequencies of said carrier wave generator and said pilot sources having relative values at which the frequency spacing between said carrier wave and the adjacent pilot frequency side-band is an integral multiple of the spacing between the two pilot frequency side-bands; and a receiver for intercepting the transmission of said transmitter and including means to select said pilot frequency side-bands, apparatus to recover the suppressed carrier provided with means to produce an auxiliary oscillation and to mix said auxiliary oscillation with one of said pilot frequency side-bands to recover the suppressed carrier wave, and means to combine said recovered carrier wave with the signal side-band to reproduce said signal.

2. A signal communication system comprising a suppressed-carrier, single side-band transmitter including a carrier wave generator, means to modulate said carrier wave with an intelligence signal to produce a single signal side-band, first and second pilot frequency sources, and means to modulate said carrier wave with said pilot frequencies to produce two pilot frequency side-bands, the frequencies of said carrier wave generator and said pilot sources having relative values at which the frequency spacing between said carrier wave and the adjacent pilot frequency side-band is an integral multiple of the spacing between the two pilot frequency side-bands; and a receiver for intercepting the transmission of said transmitter and including a pilot frequency selector stage for separating the pilot frequency side-bands from the signal side-band, a mixer stage coupled to said selector stage for producing an auxiliary oscillation having a frequency equal to an integral multiple of the frequency spacing between said pilot frequency side-bands and to combine said auxiliary oscillation with one of said pilot frequency side-bands, a carrier wave filter coupled to the output of said mixer stage to recover the suppressed carrier wave therefrom, and means to combine said recovered wave with said signal side-band to reproduce said signal.

3. A system, as set forth in claim 2, wherein said mixer stage in the receiver is constituted by a diode in series with a resistor which is connected across the output circuit of said selector stage through said carrier-wave filter.

4. A system, as set forth in claim 2, wherein said receiver further includes an intermediate-frequency amplifier stage and a detector stage, said selector stage being coupled to the output of said stage and the recovered carrier yielded by said filter being applied to said detector stage through a buffer-amplifier.

5. A system, as set forth in claim 2, wherein said receiver further includes an intermediate-frequency amplifier preceded by a mixing device, said recovered carrier wave yielded by said filter being applied to the input of said mixing device to combine with said intercepted side-bands.

6. A system, as set forth in claim 2, wherein the frequency spacing between said carrier wave and the adjacent pilot frequency is double the spacing between said two pilot frequencies.

References Cited in the file of this patent

UNITED STATES PATENTS

| | | |
|---|---|---|
| 1,449,372 | Arnold | Mar. 27, 1923 |
| 1,458,949 | Nichols | June 19, 1923 |
| 2,065,826 | Roosenstein et al. | Dec. 29, 1936 |
| 2,193,801 | Byrne | Mar. 19, 1940 |
| 2,273,023 | Bellescize | Feb. 17, 1942 |
| 2,530,614 | Hugenholtz | Nov. 21, 1950 |